(12) United States Patent
Falkenberg et al.

(10) Patent No.: US 10,318,411 B2
(45) Date of Patent: Jun. 11, 2019

(54) DISRUPTIVENESS BASED TESTING OF A WEB PAGE

(71) Applicant: International Business Machines Corporation, Armonk, NY (US)

(72) Inventors: Matthias Falkenberg, Stuttgart (DE); Timo Kussmaul, Boeblingen (DE); Klaus Rindtorff, Schoenbuch (DE); Thomas Steinheber, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/496,569

(22) Filed: Apr. 25, 2017

(65) Prior Publication Data
US 2018/0307589 A1    Oct. 25, 2018

(51) Int. Cl.
*G06F 9/44*      (2018.01)
*G06F 11/36*     (2006.01)
*G06F 17/22*     (2006.01)
*G06F 17/21*     (2006.01)

(52) U.S. Cl.
CPC ........ *G06F 11/3668* (2013.01); *G06F 17/211* (2013.01); *G06F 17/2247* (2013.01)

(58) Field of Classification Search
None
See application file for complete search history.

(56) References Cited

U.S. PATENT DOCUMENTS

| | | | |
|---|---|---|---|
| 7,895,512 B2 | 2/2011 | Roberts | |
| 8,832,590 B1* | 9/2014 | Al-Mohssen | G09G 5/00 715/785 |
| 9,792,205 B2* | 10/2017 | Young | G06F 11/3688 |

(Continued)

FOREIGN PATENT DOCUMENTS

| EP | 2327022 | 9/2015 |
|---|---|---|
| WO | WO 2009065149 | 5/2009 |

OTHER PUBLICATIONS

Lang et al., Web Based Tool for Editing Content Management Systems' Graphic Template, Published in: Intelligent Engineering Systems (INES), 2015 IEEE 19th International Conference on Date of Conference: Sep. 3-5, 2015, Retrieved from Internet: URL: http://ieeexplore.ieee.org/document/7329729/, 3 pages.

*Primary Examiner* — Insun Kang
(74) *Attorney, Agent, or Firm* — Schmeiser, Olsen & Watts, LLP; William Hartwell

(57) ABSTRACT

A method and system for dynamically testing a web page. A change to the web page is received and in response, the web page is accordingly changed. A delta vector of a change in position of a user interface control in a web browser window is determined. The change in position occurred between a first time before the change to the web page was received and a second time after the change was applied to the web page to change the web page. A user interface control weight value is determined for the user interface control having undergone the change in position. A disruptiveness factor value is determined based on the determined delta vector and the corresponding user interface control weight. A test pattern to be applied to the changed web page is selected depending on the determined disruptiveness factor. The web page is tested in accordance with the test pattern.

20 Claims, 6 Drawing Sheets

(56) References Cited

U.S. PATENT DOCUMENTS

| | | | | |
|---|---|---|---|---|
| 2003/0005044 | A1* | 1/2003 | Miller | H04L 43/50 709/203 |
| 2004/0215719 | A1* | 10/2004 | Altshuler | G06F 17/3089 709/204 |
| 2005/0132333 | A1* | 6/2005 | Neumann | G06F 11/3672 717/124 |
| 2014/0282049 | A1* | 9/2014 | Lyon | G06F 3/0484 715/744 |
| 2015/0339213 | A1* | 11/2015 | Lee | G06F 11/3664 717/125 |
| 2016/0124839 | A1* | 5/2016 | Mordo | G06F 11/3664 717/124 |
| 2016/0335171 | A1* | 11/2016 | Kenney | G06F 11/3684 |
| 2016/0350794 | A1* | 12/2016 | Amrany | G06Q 30/0239 |

* cited by examiner 100 method for dynamically adapting testing

| 102 receive a change |

| 104 determine a delta vector of a UI control |

| 106 determine a UI control weight value |

| 108 determine a disruptiveness factor |

| 110 selecting a test pattern based on the disruptiveness factor |

DISRUPTIVENESS BASED TESTING OF A WEB PAGE

TECHNICAL FIELD

The invention relates generally to a testing method, and more specifically, to a computer-implemented testing method for dynamically testing a web page.

BACKGROUND

Today, website editing has become a state-of-the-art process for editors to create appealing websites for end-users. In order to keep websites and web pages current, regular update and maintenance, and often very minor changes, are required. However, in order to guarantee high quality of the updated web pages, these pages normally undergo a standardized quality assurance process.

A/B testing is a method of comparing two versions of a web page against each other to determine which version performs better. Thus, A/B testing may provide means to test or verify whether or not a given site or modification of a web page or website is accepted and works for the end-users or customers. The impact of changes to the given web page on the user experience may be significant if there is a direct relationship to revenue streams for the hosting company and/or an e-commerce vendor.

SUMMARY

Embodiments of the present invention provide a method, and associated computer system and computer program product, for dynamically testing a web page. One or more processors of a computer system receive a change to the web page and in response, the one or more processors change the web page in accordance with the received change. The one or more processors determine a delta vector of a change in position of a user interface control in a web browser window on a computer display of the computer system. The change in position occurred between a first time before the change to the web page was received and a second time after the change was applied to the web page to change the web page. The one or more processors determine a user interface control weight value for the user interface control having undergone the change in position. The one or more processors determine a disruptiveness factor value based on the determined delta vector and the corresponding user interface control weight. The one or more processors select a test pattern to be applied to the changed web page depending on the determined disruptiveness factor. The one or more processors test the web page in accordance with the test pattern.

BRIEF DESCRIPTION OF THE DRAWINGS

Embodiments of the invention will be described, by way of example only, and with reference to the following drawings.

DETAILED DESCRIPTION

Figure 1:
FIG. 1 shows a block diagram of an embodiment of a computer-implemented method for dynamically adapting testing of a web page, in accordance with embodiments of the present invention.
Figure 1:
Figure 1:
Figure 1:
Figure 1:

Manual reviews may provide state-of-the-art process steps that need to be walked through in today's website editing workflow. A/B testing as well as manual reviews before publishing a web page are a time-consuming and expensive way of verifying a change to a given web page which may bind human and monetary resources and may slow down time-to-market for a given change to a website.

Throughout the lifecycle of a website, related web pages usually undergo larger and smaller (incremental) changes which may or may not alienate the end-user once he or she faces the changed website and thus, need more or less cautious reviews.

Tedious, time-consuming and expensive review and A/B testing processes—if used as standard process—offer therefore a potential for saving time and money during a publishing process if the modifications made to a web page meet certain criteria.

The present invention utilizes the following definitions, conventions, terms and/or expressions:

The term 'delta vector' is defined as a mathematical vector in which dimensions changes to specific aspects of a UI (user interface) control are expressed in numbers. A simple example may be a click button whose position may be changed on a web page. If the position of the click button in a web browser window on a computer display (e.g., the display 720 in FIG. 7) may be changed horizontally from a top left to a top right position, the aspect "horizontal position" may have a value of 1.0. There may be a plurality of different change aspects to a UI control such as: horizontal position, vertical position, color scheme, size, frame, font of text, size of text, relative position to logically related other UI controls (e.g., OK button and cancel/quit button) and so on. Additional aspects may be added to the delta vector based on experience made with actual end-users of a web page. Each delta vector has n elements, wherein n is at least 1, and in one embodiment n is at least 2.

The term 'user interface control' is defined as a widget which is an element of interaction in a graphical user interface (GUI). Examples of widgets include, inter alia, a button or a scroll bar. In one embodiment, the interface controls may be related to software components that a computer user interacts with through direct manipulation to read or edit information about an application. Each widget facilitates a specific type of user-computer interaction and appears as a visible part of the application's GUI, as defined by a theme and rendered by a rendering engine. The theme makes all widgets adhere to a unified aesthetic design and creates a sense of overall cohesion. Some widgets support interaction with the user; for example labels, buttons, and check boxes. Other widgets act as containers that group the widgets added to the containers; for example windows, panels, and tabs. In various embodiments, output text boxes or other graphical elements not allowing an interaction (e.g., explanatory text, images or videos) may be denoted as a UI control.

The term 'change', as applied to a web page layout or a web page's content, is defined as a manipulation performed to the web page layout or the web page's content; in particular, a modification to a UI control on the web page. Each type of change may be reflected as an aspect or dimension of the related change vector.

The term 'user interface control weight' (in particular, a related 'UI control weight value') is defined as a factor reflecting and the importance of the UI control on the web page. For example, a confirm button (UI control) may have a higher importance as a scroll up or scroll down button (UI control). The different UI controls may be perceived more or less important in comparison to other UI controls on a web page. In particular, if a UI control (e.g., an OK button UI control) is not be positioned as expected, a UI control weight factor value may be increased.

The term 'disruptiveness factor' of a web page, and in particular a related 'disruptiveness factor value', is defined as a normalized value between 0 and 1 expressing the amount of changes the web page (in particular, one or more UI controls on the web page) has undergone. In one embodiment, the disruptiveness factor may be expressed as the mathematical distance between a user experience of a web page before and after a change made to the web page. In one embodiment, the disruptiveness factor may be expressed as the length of the delta vector multiplied with individual user interface control weight values.

The term 'test pattern' for a web page is defined as a characteristic of a certain test activity performed in response to a changed web page. This characteristic may be an A/B testing, a review and judgment in person by a supervisor/executive or a member of a peer-group. Also a "no test required" may be a valid test pattern.

The term 'aspect' of a UI control is defined as a specific characteristic of a UI control. An aspect value may be a number in a dimension of the delta vector. Examples of aspects have already been given above.

The term 'aspect weight factor' for a UI control (in particular, an aspect weight factor value) is defined as a numerical value reflecting a relative weight of a change aspect to a UI control in a relationship to other change aspects of the UI control. Thus, a position aspect may have a higher aspect weight value than a change of a font size by 1 point of the text of a UI control.

The term 'sub-vector' is defined as a partial vector of the delta vector, the partial vector reflecting performed changes to a web page, wherein each sub-vector may relate to one UI control, whereas the sum of the sub-vectors may relate to all changes made to all UI control of a changed web page. In one embodiment, each sub-vector is one distinct single element of the delta vector such that the total number of sub-vectors of the delta vector is equal to the total number of elements of the delta vector. In one embodiment, at least one sub-vector comprises a plurality of elements of the delta vector such that the total number of sub-vectors of the delta vector is less than the total number of elements of the delta vector.

The term 'length of delta vector' may denote a numerical, scalar value expressing the amount of change performed to one or more UI controls of the web page. Mathematically, the length of the delta vector may also denote a norm of the data vector and may be calculated as known by a skilled person as square root of the sum of squares of the dimension values.

The term 'adapting testing' of a web page is defined as adjusting the testing of the web page to conform to the changed web page resulting from the changes in the web page.

The method of the present invention for dynamically adapting testing of a web page may offer multiple advantages and technical effects:

The inventive method and system may help to implement an automatic categorization of a change, or a plurality of changes, to a web page. In order to support high-quality websites, it may be required to determine and assess the impact to changes made to the web page because of the impact of the changes to the user experience. A change may result in a delta vector between the previous version of a web page and the changed version of the web page. Currently, such changes may be assessed in a manual time-consuming process. The method and system of the present invention support the assessment process by automatically determining changes made to UI controls, expressing the changes in numerical form and influencing the manner the changed web page is assessed and tested. Through the automatic and dynamic selection of a test pattern, subjective assessments regarding individual UI control changes are avoided. The analysis performed by the present invention is based on historical data and also may include a clickstream analysis. Thus, the measurement of a made user experience may directly influence the selection of the test pattern used to enhance the quality of an edited web page.

The system and method of the present invention may release web page editors and quality assurance personnel from standard assessment processes. For example, minor changes such as a correction of a typo or adding/deleting a word may not undergo a quality assurance process at all. Thus, available personnel may focus on the non-standard changes to web pages and thus enhance the overall quality and usability of the web site while reducing expenses and effort required for testing.

Furthermore, the method and system of the present invention provide capabilities to continuously enhance aspects (i.e., dimensions of the data vector) based on experiences made with a continuous development process of web pages. Additionally, the growing experience of certain team members in the quality assurance process of a web page may be reflected by individual profiles and experience values of a certain team member in relationship to the disruptiveness factor value for a performed change to a web page.

The inventive method may also provide website publishing automation, since it may be automatically and dynamically determined which next step has to be performed after a change has been made to a web page. Thus, the production workflow of a web page management (in particular in the final quality assurance step of the production workflow) may be controlled by the method and system of the present invention.

According to one embodiment of the method of the present invention, determining a delta vector of the user interface control may comprise determining a plurality of delta vector components (i.e., dimensions). Each delta vector component value may represent one aspect of the UI control of the web page. Such a vector may have the form $V1=(a1, b1, c1, \ldots z1)$, in which $a1, b1, c1, \ldots$ may be numerical values for each of the changed aspects (e.g., visual aspects) of a UI control. It may be noted that also other non-visual aspects may be assessed such as aspects related to sound or video of a UI control. Thus, changes performed to a UI control may be expressed in mathematical form in order to undergo a machine-based assessment.

According to one embodiment of the method of the present invention, the aspects may be selected from a contrast change, a color scheme change, a language change, a relative location change and a text change, a font change, a size change, a form factor change (e.g., related to a desktop version of the web page versus a mobile version), and a tonality change. The tonality change may differentiate between, e.g., a funny, a grief or an angry language based on an assessment of a cognitive analysis determinator engine. It may also be noted that the individual changes may be determined by different determinator engines accessible from a delta determinator registry. These individual delta determinator engines may be adapted individually such that individual aspects of the changes performed to a web page may be enhanced individually in respect to another analysis determinator engine. Newly made experiences with user acceptances of performed changes may be reflected individually. It may be noted that instead of the term 'determinator", the term "determiner" may be used.

According to one embodiment of the method of the present invention, each component of the delta vector may have an associated aspect weight factor assigned, based on an experience repository of changes to the different aspects. Thus, performed changes may be assessed and automatically determined in a fine-grained model. Adaptations and changes to the automatic delta vector assessment may be possible. Mathematically, the delta vector $V1=(a1, b1, c1, \ldots z1)$ may be multiplied with the matrix having the aspect weight factor values (ga, gb, gc, . . . , gz) on the matrix's main diagonal.

According to one embodiment of the method of the present invention, the delta vector may comprise a plurality of sub-vectors or partial vectors. Each sub-vector may relate to a respective user interface control. It may be noted that each sub-vector may reflect all different aspects of a specific UI control. In this embodiment, each sub-vector is a distinct single element of the delta vector, so that the total number of sub-vectors of the delta vector is equal to the total number of elements (n) of the delta vector.

According to one embodiment of the method of the present invention, the disruptiveness factor value may be determined by $$|DF|= \text{square root}((w1*V1)^2+(w2*V2)^2+ \ldots +(wn*Vn)^2), \quad \text{(formula 1)}$$

wherein

|DF|=length or norm of the delta vector, wi=user interface control weight factor value for an i-th sub-vector, Vi=i-th sub-vector value which may be weighted by the aspect weight factors, and i=1, 2, . . . , n.

Thus, a clear, simple and reliable determination algorithm is given to define a normalized value of the delta vector in order to determine the influence that a change to a web page may have on the user experience of the web page.

According to an embodiment of the method of the present invention, the test pattern may be selected from a peer review, an A/B testing, and an executive review. Furthermore, as an additional option, no test pattern may be selected. Thus, the changed web page may either be reviewed in person by a peer group member or a supervisor/executive, using an A/B testing or the changed web page may not be tested at all. The last option may be selected if only minor changes have been made to the web page, which may be expressed by a comparably small amount of the data vector value.

According to an embodiment of the method of the present invention, selecting the test pattern may also be based on an editor profile and an editor reputation value relative to the determined disruptiveness factor value. Thus, the experience of a team member of the quality assurance team for web pages may be adapted over time reflecting the team member's experience in assessing user experiences relating to changed web pages.

According to one embodiment of the method of the present invention, the web page may be stored, and in particular managed, in a content management system. Thus, the method and system of the present invention may represent enhancements to existing content management systems (CMS), Web-CMSs, workflow control engines of website and/or web page editors or the like. The method of the present invention provides means for an automatic adaption of a web page management workflow during editing activities.

According to one embodiment of the method of the present invention, the web page may be designed using a markup language such as any form or version of HMTL (HyperText Markup Language). Thus, the method may be implementable with virtually any kind of web page management system. However, the method and system may also be used for differently coded web pages as long as visual representations of UI controls may be extractable from the code. It may also be noted that the assessment of the change is mainly related to the visual user experience of individual components (UI controls) of a web page.

A detailed description of the figures will be presented next. All instructions in the Figures are schematic. Firstly, a block diagram of an embodiment of the inventive computer-implemented method for dynamically adapting testing of a web page is provided. Afterwards, further embodiments, as well as embodiments of the system for dynamically adapting testing of a web page, will be described.

FIG. 1 shows a block diagram of an embodiment of a computer-implemented method 100 for dynamically adapting testing of a web page, in accordance with embodiments of the present invention. The web page may have actually existed and may have been changed. The method comprises receiving a change in step 102 (in particular, one or more modifications to one UI control) to the web page to be published and determining, in step 104, a delta vector of a UI control between the web page before receiving the change to the web page and after the change is applied to the web page. The changed web page may not yet be published. The delta vector may be based on a relative importance of changes from a user perspective; i.e., based on the user experience.

The method comprises further determining, in step 106, a UI control weight value for the user interface control having undergone the change, which may actually be based on a click-through rate, a termination rate, and/or similar parameters. Furthermore, the method comprises determining, in step 108, a disruptiveness factor value based on the determined delta vector and the corresponding user interface control weight. Because the delta vector is based on a subjective user experience related to the change to the web page, the disruptiveness factor is also based on the (mainly) visual user experience regarding the web page having undergone the change. If more than one UI control has been changed, the disruptiveness factor reflects all changes to all modified UI controls including related weight factors of the individual UI controls as well as potential weights of individual aspects of each UI control.

Figure 2:
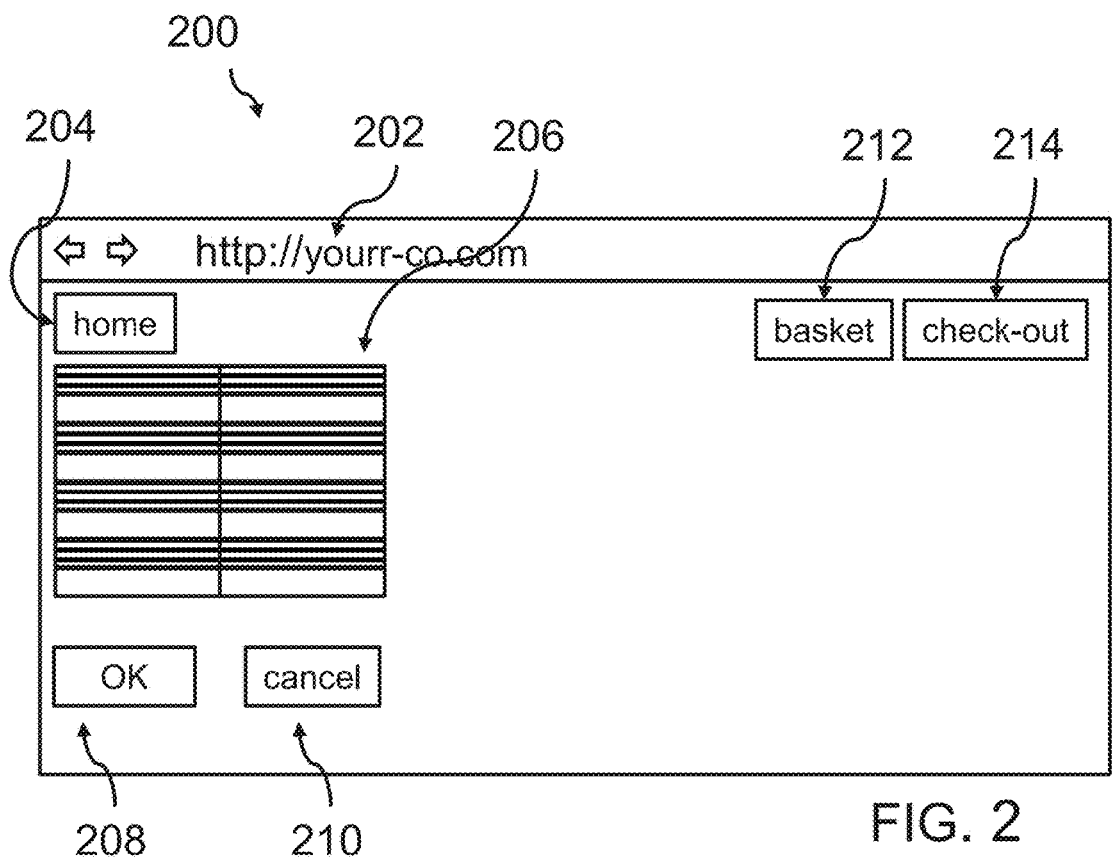
FIG. 2 shows a block diagram of an embodiment of a sample web page, in accordance with embodiments of the present invention.

The method comprises selecting, in step 110, a test pattern to be applied to the changed web page depending on the determined disruptiveness factor. Thus, the to-be-used testing process may be determined by the method and system in an advantageous way, saving labor by not requiring test sequences to the changed web page. FIG. 2 shows a block diagram of an embodiment of a sample web page 200, in accordance with embodiments of the present invention. The web page 200 has the input field 202 for a URL (universal resource locator). Furthermore, a series of UI controls is shown at specific positions on the web page 200: a home button 204, a data output table 206 (or scroll area), an OK button 208, a cancel button 210, a basket button 212 and a check-out button 214. Thus, this page 200 may represent a simple e-commerce shopping web page.

Figure 3:
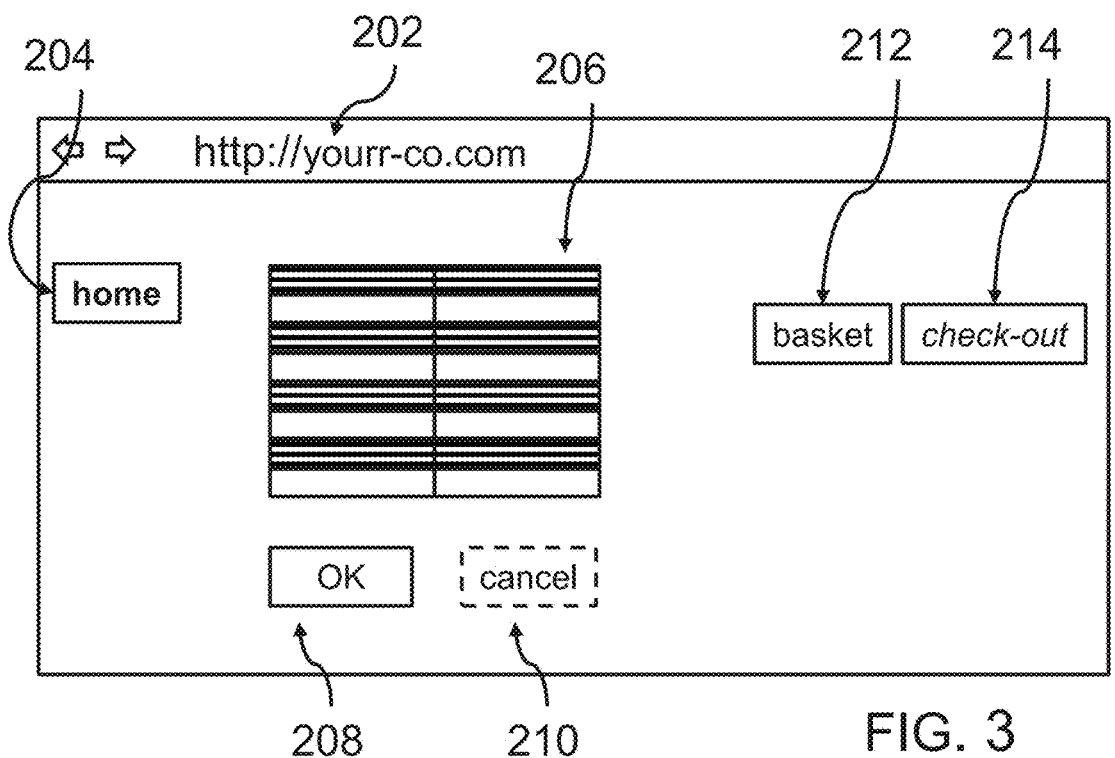
FIG. 3 shows a block diagram of an embodiment of the web page of FIG. 2 with modifications, in accordance with embodiments of the present invention.

FIG. 3 shows a block diagram of an embodiment of the web page 200 of FIG. 2 with modifications, in accordance with embodiments of the present invention. As shown, the home button 204 has been moved a little bit below the original position of the home button 204. The data output table 206 as well as the OK button 208 and the cancel button 210 have been moved to the right. Additionally, the basket button 212 and the check-out button 214 have been moved to lower positions on the web page 200. What appear to be minor changes may have a massive influence on the user experience regarding the web page 200.

Furthermore, the fonts of the UI controls home button 204 and check-out 214 have been changed. The home button 204 text is now displayed in bold letters, whereas the text on the check-out button 214 is displayed in cursive letters. It may also be noted, that the cancel-button 210 has now a dashed line frame. However, many additional changes may be made to the web page in form of a different color scheme, changed images, relative distance of related control buttons, and so on.

Two types of weight values may be applied in order to perform the delta vector expressing the change being made to the web page 200. A first weight value may be related to individual UI controls: the user interface control weight value. A set of second weight values may be related to individual aspects; i.e., dimensions of the delta vector. Hence, each aspect such as size, font, contrast, color, movement in x-direction, movement in y-direction, etc. may also have its individual weight value: the aspect weight factors. With these different weight factors, a fine-tuned model for changes to the web page (in particular in light of a related user experience) may be designed.

Figure 4:
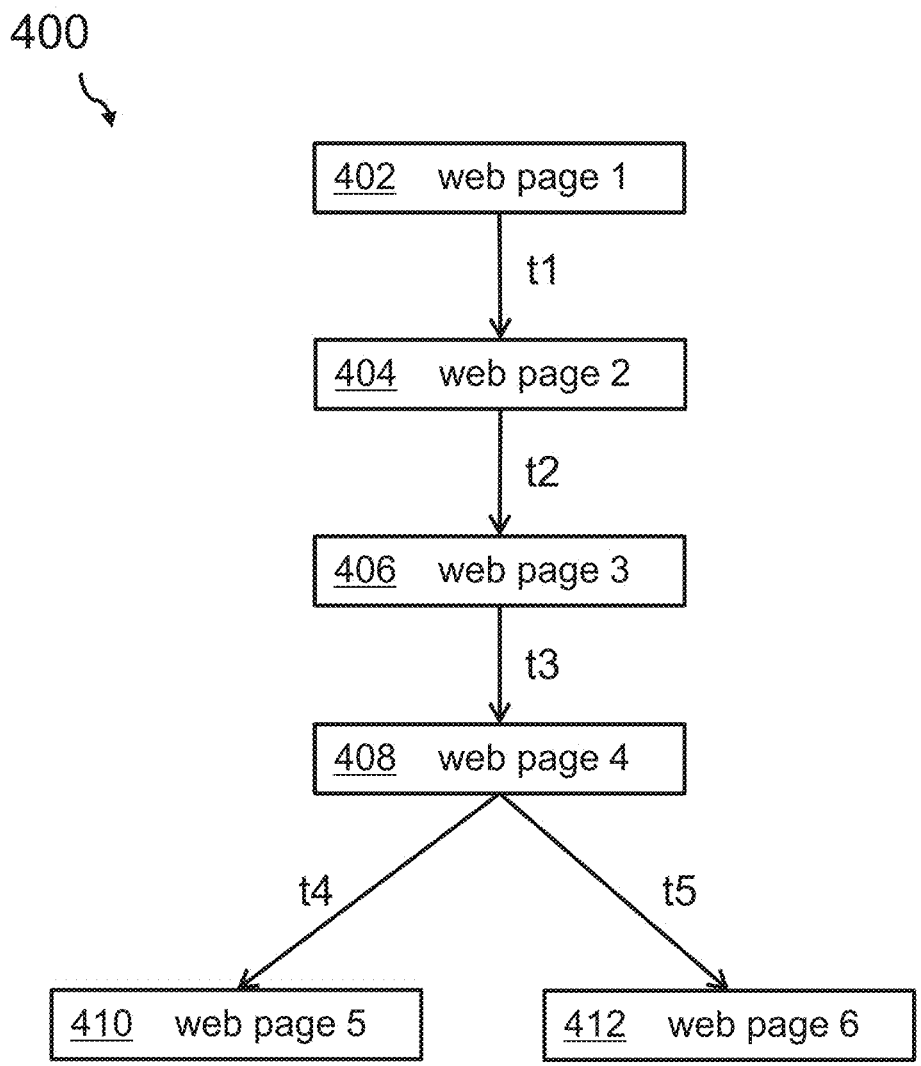
FIG. 4 shows a result of an exemplary click stream analysis of a click-through rate, in accordance with embodiments of the present invention.

FIG. 4 shows a result of an exemplary click stream analysis 400 of a click-through rate, in accordance with embodiments of the present invention. Symbolically shown are 6 web pages 402, 404, 406, 408, 410, 412. A user may proceed from one web page to the next web page by clicking on a related UI control. The easier it is for a user to navigate between different web pages of a website, the less time t1, t2, t3, t4, t5 a user may need to navigate from one web page to another. If a change is made to (e.g., web page 406), the click-through rate measured to go from web page 2 (404) to web page 4 (408) via web page 3 (406) slows down, and consequently a change to the web page 3 is more severe. Different UI controls on the different web pages may represent different paths through a website. Thus, the different UI controls on the different web pages may be given different weights, as explained above.

The actual delta vector length may be determined by using formula 1 (see above). For comparative reasons, the data vector value may be normalized to a value between 0 and 1.

Figure 5:
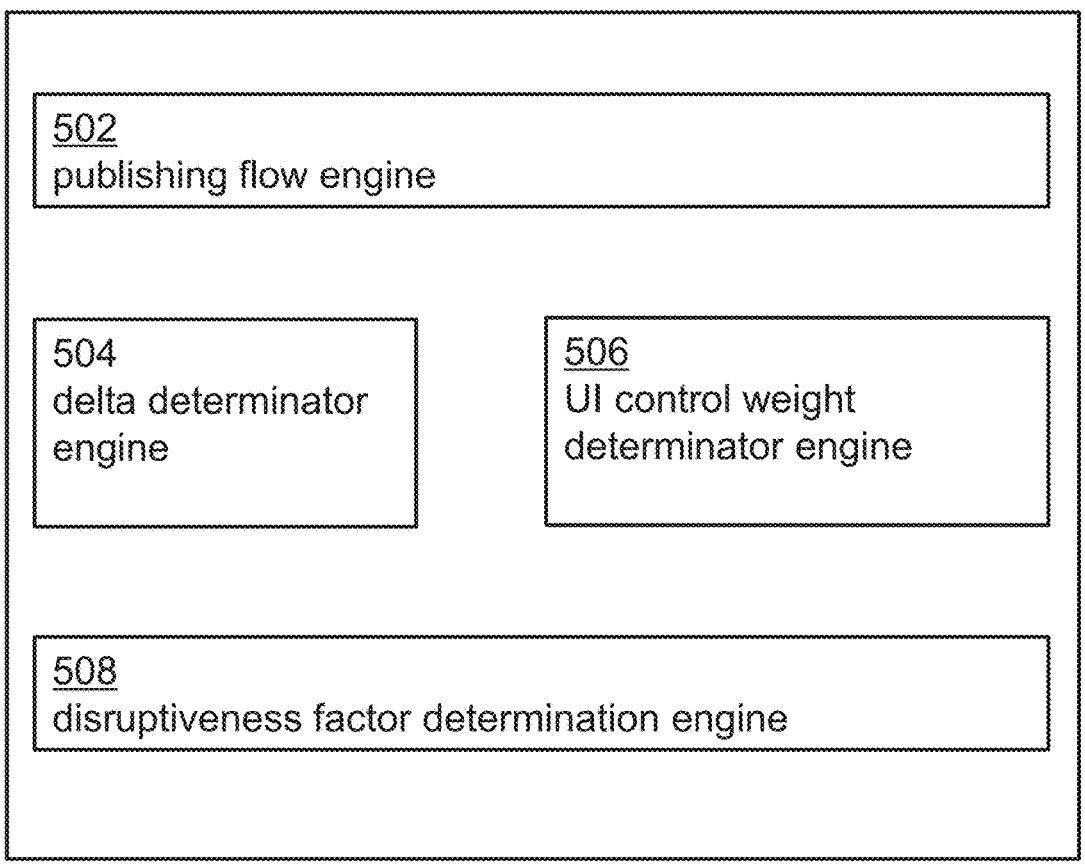
FIG. 5 shows an embodiment of a system for dynamically adapting testing of a web page, in accordance with embodiments of the present invention.

FIG. 5 shows an embodiment of a system 500 for dynamically adapting testing of a web page, in accordance with embodiments of the present invention. The system comprises a publishing flow engine 502 adapted for receiving a change to the web page to be published and a delta determinator engine 504 adapted for determining a delta vector of a UI control between the web page before receiving the change to the web page and after the change is applied to the web page. The delta determination engine 504 makes use of inputs of a UI control weight determinator engine 506 adapted for determining a user interface control weight value for the user interface control having undergone a change and a disruptiveness factor determination engine 508 adapted for determining a disruptiveness factor value based on the determined delta vector and the corresponding user interface control weight.

The publishing flow engine 502 is also adapted for selecting a test pattern to be applied to the changed web page depending on the determined disruptiveness factor. A test of the web page may be performed in accordance with the test pattern in response to the changed web page.

Figure 6:
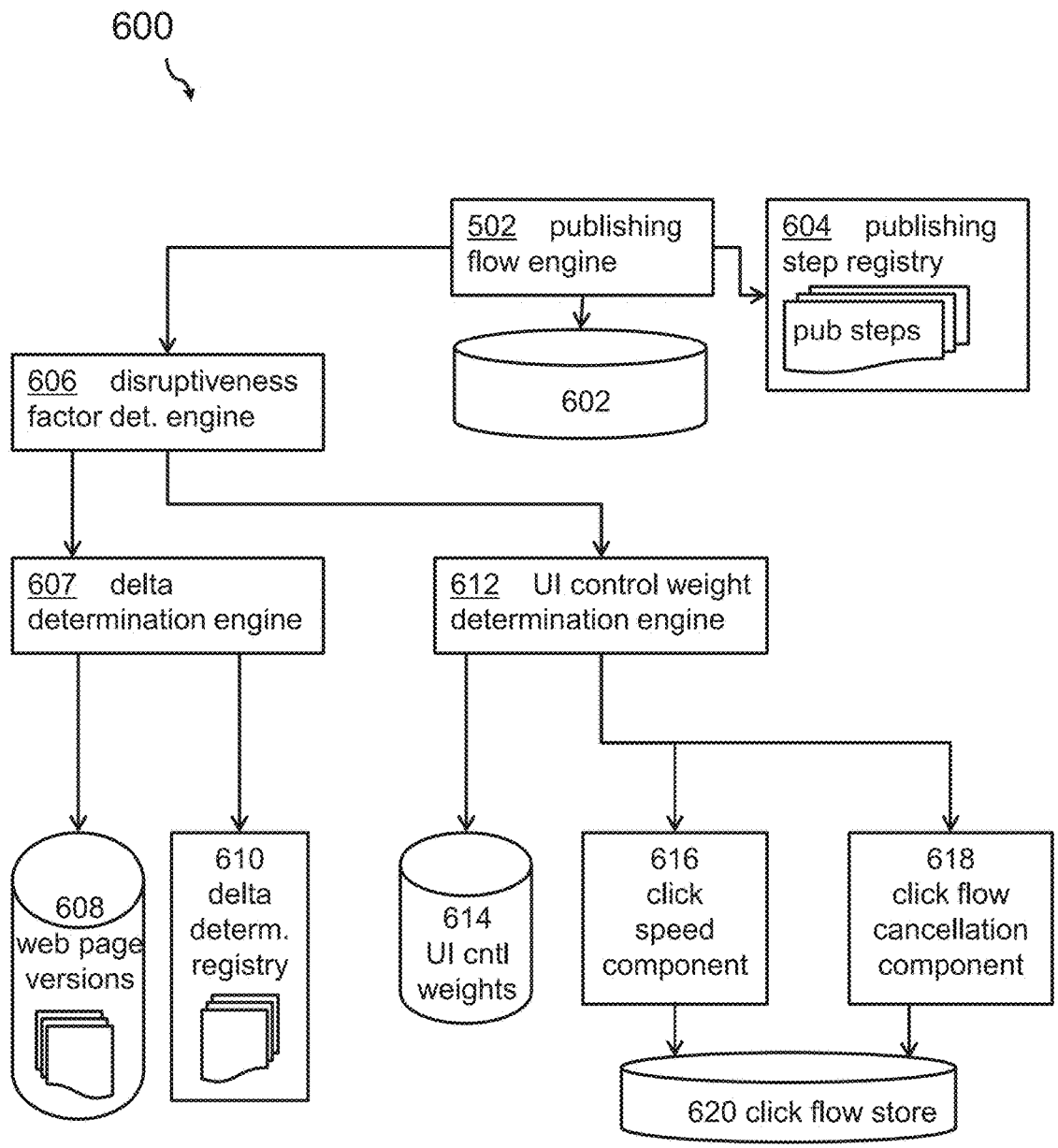
FIG. 6 shows an embodiment of interrelated control engines for building the system of FIG. 5 for dynamically adapting testing of a web page, in accordance with embodiments of the present invention.

FIG. 6 shows an embodiment 600 of interrelated control engines for building the system 500 of FIG. 5 for dynamically adapting testing of a web page, in accordance with embodiments of the present invention. FIG. 6 shows a more detailed implementation schema for the techniques of the present invention. It may be noted that FIG. 6 shows only a part of the functionality of the publishing flow engine 502, in particular the aspect of an automation of the publishing process in the final testing phase.

Overall control of a testing workflow is assigned to the publishing flow engine 502. The arrows in the diagram between the different functional boxes may express which engine is calling which sub-engine. Thus, the publishing flow engine 502 calls the disruptiveness factor determination engine 606 and decides, based on the disruptiveness factor value delivered back, and, e.g., the editor reputation or role which is loaded from the disruptiveness factor threshold store, which publications steps are mandatory, or started automatically moving forward, or can be skipped. These decisions are auto-start triggers of publishing steps and may include:

automatic A/B testing and determination of group sizes;
peer review;
executive review; and
skipping of all steps and hot publishing (i.e., publishing of the web page without any additional testing step).

The disruptiveness factor determination engine 606 calls the delta determination engine 607 which computes a delta vector for all of the changes that have been performed to the web page in question (e.g., repositioning of UT controls, change of font, color, contrast, . . . ) compared to the previous version of the web page. The set of criterions that make up (i.e., represent the dimensions) the delta vector can be a fixed set of properties or the seed from a higher level logic / smartness; e.g., from analyzing past changes made to the web site and related user reactions.

The delta determination engine 607 accesses a web page version repository 608 storing the actual and previous version(s) of the web page, as well as, a delta determinator registry 610 comprising data determinator engines for the different aspects of a UI control. Examples of data determinator engines are those data determinator engines that are related to UI characteristics or aspects such as contrast, position, language, frame, boldness, font, etc.

Furthermore, the disruptiveness factor determination engine 606 calls the UI control weight determination engine 612 which determines the weights of all UI controls on a given web page, which may be a result of the usage of the click flow cancellation component 618 and/or the click speed component 616, but also allows for manual administration of the UI control weights. Both the click speed component 616 and the click flow cancellation component 618 may use input values stored in the click flow store 620. The click flow store 620 may store results of a click stream analysis, as explained in the context of FIG. 3.

The disruptiveness factor determination engine 606, after having computed the disruptiveness factor value, returns this disruptiveness factor value to the publishing flow engine 502. Based on the result and a comparison with related values of the disruptiveness factor threshold store 602, a related publishing step may be selected out of the publishing step registry 604, as explained above.

The disruptiveness factor threshold store 602 may store user-based and/or reputation-based (e.g., based on an editor profile) threshold values required for an individual publishing and/or testing step. A low value of the disruptiveness factor, on a scale from 0 to 1, may require no additional testing because only very minor changes may have been made to the web page. A slightly higher disruptiveness factor may require a peer review. An again higher disruptiveness factor value may require a supervisor or executive review; and a very high disruptiveness factor (e.g., above 0.9) may require an A/B testing and may also require a determination of the group size for such an advanced testing.

In other words, a sequence of steps of a typical editing workflow with the inventive method and system may include:

1. The editor uses the editor's web page editing environment of choice and makes changes to a web page that is already public.
2. The editor finalizes the editor's changes and triggers the publishing flow for the editor's changes.
3. The publishing flow engine 502 loads the editor's disruptiveness factor threshold from the disruptiveness factor threshold store 602.
4. The publishing flow engine 502 calls the disruptiveness factor determination engine 606 to get the delta factor for the given change to the web page.
5. The disruptiveness factor determination engine 606 invokes the delta determination engine 607 in order to get the delta vectors for all changes that have been made to UI controls on the web page.
6. The delta determination engine 607 analyzes and compares the changes to each UI control with the previous version of the web page and sends back a list of delta scores/vectors for each UI control that has been changed.
7. The disruptiveness factor determination engine 606 invokes the UI control weight determination engine 612 in order to get relative weights for each UI Control that has been changed on the web page.
8. The UI control weight determination engine 612 invokes the click speed component 616 to get transition times t1 to tn between the UI Controls within a click flow (compare FIG. 3).
9. The UI control weight determination engine 612 invokes the click flow cancellation component 618 to get the cancellation points within a click flow (compare FIG. 3).
10. The UI control weight determination engine 612 assigns weights to each UI control that has been changed based on the information returned from the click speed component 616, the click flow cancellation component 618, and the UI control weight store 614 which may hold manually administered weights for UI controls.
11. The UI control weight determination engine 612 returns the computed set of weights for the requested set of UI controls to the disruptiveness factor determination engine 606.
12. The disruptiveness factor determination engine 606 computes a disruptiveness factor based on the delta score/vector of each UI control that has been changed (as returned by the delta determination engine 607) and the relative weight that has been assigned to those UI controls (as returned by the UI control weight determination engine 612).
13. The disruptiveness factor determination engine 606 returns the computed disruptiveness factor to the publishing flow engine 502.
14. The publishing flow engine 502 compares the received disruptiveness factor with the disruptiveness factor threshold, as loaded in step 3.
15. The publishing flow engine 502 initiates a set of publishing steps that derive from the comparison outlined in the previous step 14. The publishing steps may comprise direct publish, an A/B testing publish only, an additional review process that has to be started. In case a review process is to be started, and the outcome is successful, (i.e., the changes the Editor made are approved by the reviewers) this feedback may flow back to the reputation score and thus the disruptiveness factor threshold for the editor.

Figure 7:
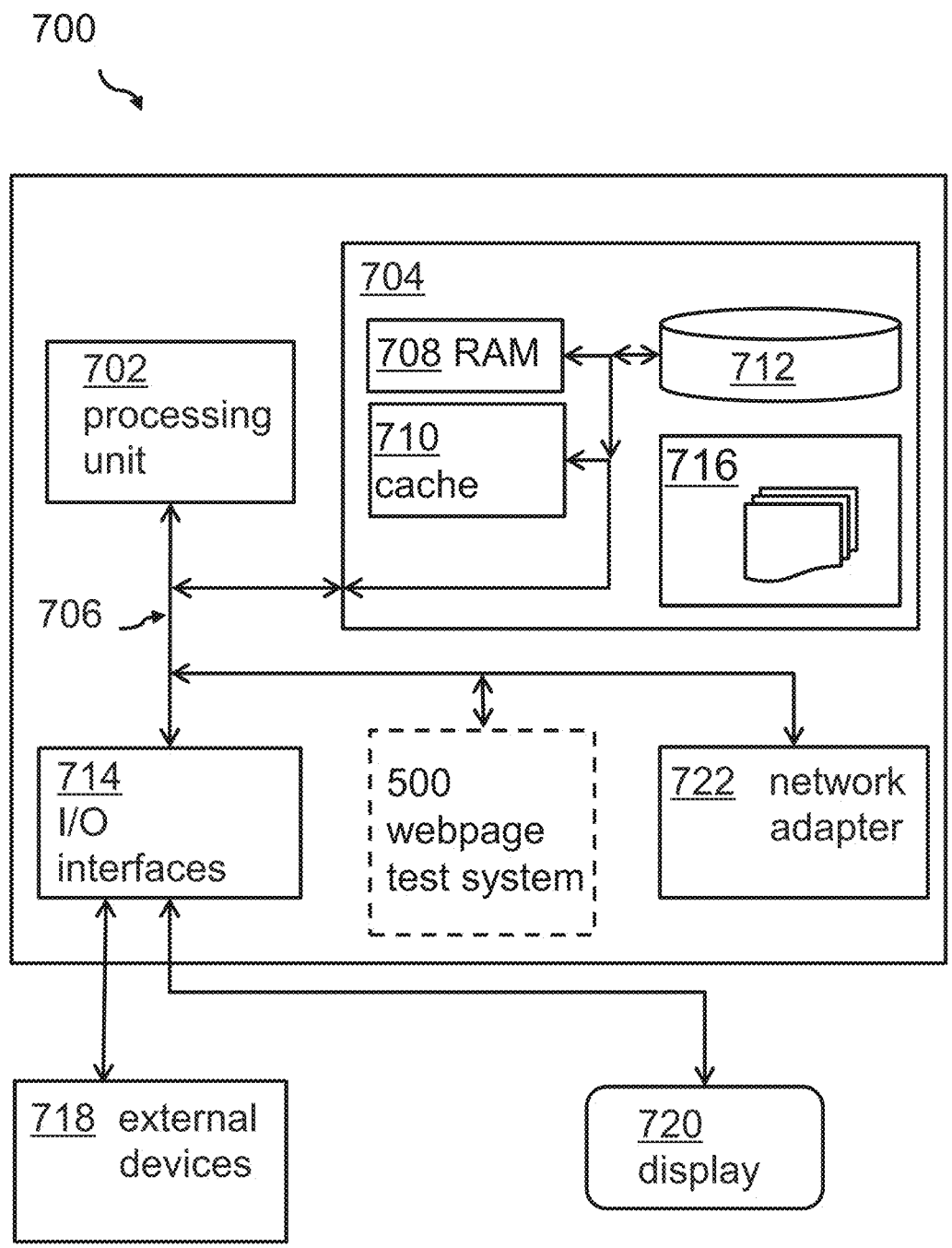
FIG. 7 shows an embodiment of a computing system comprising the system of FIG. 5 for dynamically adapting testing of a web page, in accordance with embodiments of the present invention.

Embodiments of the invention may be implemented together with virtually any type of computer, regardless of the platform being suitable for storing and/or executing program code. FIG. 7 shows, as an example, a computing system 700 suitable for executing program code related to the inventive method.

FIG. 7 shows an embodiment of the computing system 700 comprising the system 500 of FIG. 5 for dynamically adapting testing of a web page, in accordance with embodiments of the present invention. The computing system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couples various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the invention as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (IO) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the system 500 for dynamically adapting testing of a web page may be attached to the bus system 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for automatically and dynamically controlling publication of a changing web page, said method comprising:

receiving, by one or more processors of a computer system, a change to the web page that is already public and in response, said one or more processors changing the web page in accordance with the received change;

invoking a delta determination engine to determine, by the one or more processors, a delta vector of a change in position of a user interface control in a web browser window on a computer display of the computer system, said change in position having occurred between a first time before the change to the web page was received and a second time after the change was applied to the web page to change the web page;

invoking a click speed component to get information on transition times between user interface controls including the user interface control within a click flow;

invoking a user interface weight determination engine to assign weights to each user interface control that has been changed based on the information returned from the click speed component and to automatically determine, by the one or more processors, a user interface control weight value for the user interface control having undergone the change in position, said user interface control weight value indicating an importance of the user interface control on the web page;

calling a disruptiveness factor determination engine to determine, by the one or more processors, a disruptiveness factor value based on the determined delta vector and the corresponding user interface control weight value, said disruptiveness factor value being a normalized value expressing an amount of change the user interface control has undergone;

calling a publishing flow engine to compare the disruptiveness factor value with a disruptiveness factor threshold;

in response to a result of said comparing, automatically and dynamically selecting, by the one or more processors from a plurality of test patterns, a test pattern to be applied to the changed web page depending on the determined disruptiveness factor value;

dynamically testing, by the one or more processors, the changed web page in accordance with the selected test pattern without requiring test sequences to the changed web page;

automatically and dynamically publishing the changed web page, by the one or more processors, in dependence on a result of said testing.

2. The method of claim 1, wherein said determining the delta vector comprises determining a plurality of delta vector component values, one delta vector component value for each aspect of a plurality of aspects of the user interface control on the web page.

3. The method of claim 2, wherein the plurality of aspects of the user interface control comprise at least one change selected from the group consisting of a contrast change, a color scheme change, a language change, a relative location change, a text change, a font change, a size change, a form factor change, a tonality change, and combinations thereof.

4. The method of claim 2, wherein each component of the delta vector has an aspect weight factor value assigned based on changes to the plurality of aspects, said changes to the plurality of aspects having been recorded in an experience repository.

5. The method of claim 1, wherein the delta vector comprises a plurality of sub-vectors, and wherein each sub-vector relates to a respective user interface control.

6. The method of claim 5, wherein each sub-vector is a distinct single element of the delta vector so that the total number of sub-vectors of the delta vector is equal to the total number of elements (n) of the delta vector, and wherein said determining the disruptiveness factor value comprises computing $|DF|$ via:

$|DF| = w1*V1 + w2*V2 + \ldots + wn*Vn$, wherein:

$|DF|$ = length or norm of the delta vector, $wi$ = user interface control weight factor value for an i-th sub-vector, $Vi$ = i-th sub-vector value weighted by aspect weight factors assigned based on changes to each aspect of a plurality of aspects of the user interface control, respectively, and $i = 1, 2, \ldots, n$.

7. The method of claim 1, wherein the test pattern is a peer review, an A/B testing, an executive review, or combinations thereof.

8. The method of claim 7, wherein said selecting the test pattern is based on a user profile and a user reputation value relative to the determined disruptiveness factor value.

9. The method of claim 1, wherein the web page is stored in a content management system.

10. The method of claim 1, wherein the web page is designed using a markup language.

11. A computer program product, comprising one or more computer readable hardware storage devices having computer readable program code stored therein, said program code containing instructions executable by one or more processors of a computer system to implement a method for automatically and dynamically controlling publication of a changing web page, said method comprising:

receiving, by one or more processors of a computer system, a change to the web page that is already public and in response, said one or more processors changing the web page in accordance with the received change;

invoking a delta determination engine to determine, by the one or more processors, a delta vector of a change in position of a user interface control in a web browser window on a computer display of the computer system, said change in position having occurred between a first time before the change to the web page was received and a second time after the change was applied to the web page to change the web page;

invoking a click speed component to get information on transition times between user interface controls including the user interface control within a click flow;

invoking a user interface weight determination engine to assign weights to each user interface control that has been changed based on the information returned from the click speed component and to automatically determine, by the one or more processors, a user interface control weight value for the user interface control having undergone the change in position, said user interface control weight value indicating an importance of the user interface control on the web page;

calling a disruptiveness factor determination engine to determine, by the one or more processors, a disruptiveness factor value based on the determined delta vector and the corresponding user interface control weight value, said disruptiveness factor value being a normalized value expressing an amount of change the user interface control has undergone;

calling a publishing flow engine to compare the disruptiveness factor value with a disruptiveness factor threshold;

in response to a result of said comparing, automatically and dynamically selecting, by the one or more processors from a plurality of test patterns, a test pattern to be applied to the changed web page depending on the determined disruptiveness factor value;

dynamically testing, by the one or more processors, the changed web page in accordance with the selected test pattern without requiring test sequences to the changed web page;

automatically and dynamically publishing the changed web page, by the one or more processors, in dependence on a result of said testing.

12. The computer program product of claim 11, wherein said determining the delta vector comprises determining a plurality of delta vector component values, one delta vector component value for each aspect of a plurality of aspects of the user interface control on the web page.

13. The computer program product of claim 12, wherein the plurality of aspects of the user interface control comprise at least one change selected from the group consisting of a contrast change, a color scheme change, a language change, a relative location change, a text change, a font change, a size change, a form factor change, a tonality change, and combinations thereof.

14. The computer program product of claim 12, wherein each component of the delta vector has an aspect weight factor value assigned based on changes to the plurality of aspects, said changes to the plurality of aspects having been recorded in an experience repository.

15. The computer program product of claim 11, wherein the delta vector comprises a plurality of sub-vectors, and wherein each sub-vector relates to a respective user interface control.

16. A computer system, comprising one or more processors, one or more memories, and one or more computer readable hardware storage devices, said one or more hardware storage device containing program code executable by the one or more processors via the one or more memories to implement a method for automatically and dynamically testing a controlling publication of a changing web page, said method comprising:

receiving, by one or more processors of a computer system, a change to the web page that is already public and in response, said one or more processors changing the web page in accordance with the received change;

invoking a delta determination engine to determine, by the one or more processors, a delta vector of a change in position of a user interface control in a web browser window on a computer display of the computer system, said change in position having occurred between a first time before the change to the web page was received and a second time after the change was applied to the web page to change the web page;

invoking a click speed component to get information on transition times between user interface controls including the user interface control within a click flow;

invoking a user interface weight determination engine to assign weights to each user interface control that has been changed based on the information returned from the click speed component and to automatically determine, by the one or more processors, a user interface control weight value for the user interface control having undergone the change in position, said user interface control weight value indicating an importance of the user interface control on the web page;

calling a disruptiveness factor determination engine to determine, by the one or more processors, a disruptiveness factor value based on the determined delta vector and the corresponding user interface control weight value, said disruptiveness factor value being a normalized value expressing an amount of change the user interface control has undergone;

calling a publishing flow engine to compare the disruptiveness factor value with a disruptiveness factor threshold;

in response to a result of said comparing, automatically and dynamically selecting, by the one or more processors from a plurality of test patterns, a test pattern to be applied to the changed web page depending on the determined disruptiveness factor value;

dynamically testing, by the one or more processors, the changed web page in accordance with the selected test pattern without requiring test sequences to the changed web page;

automatically and dynamically publishing the changed web page, by the one or more processors, in dependence on a result of said testing.

17. The computer system of claim 16, wherein said determining the delta vector comprises determining a plurality of delta vector component values, one delta vector component value for each aspect of a plurality of aspects of the user interface control on the web page.

18. The computer system of claim 17, wherein the plurality of aspects of the user interface control comprise at least one change selected from the group consisting of a contrast change, a color scheme change, a language change, a relative location change, a text change, a font change, a size change, a form factor change, a tonality change, and combinations thereof.

19. The computer system of claim 17, wherein each component of the delta vector has an aspect weight factor value assigned based on changes to the plurality of aspects, said changes to the plurality of aspects having been recorded in an experience repository.

20. The computer system of claim 16, wherein the delta vector comprises a plurality of sub-vectors, and wherein each sub-vector relates to a respective user interface control.

\* \* \* \* \*